United States Patent
Hoffmann

(10) Patent No.: US 8,335,947 B2
(45) Date of Patent: Dec. 18, 2012

(54) AVAILABILITY ANALYSIS TOOL

(75) Inventor: Gerald R. Hoffmann, Littleton, CO (US)

(73) Assignee: Raytheon Company, Waltham, MA (US)

(*) Notice: Subject to any disclaimer, the term of this patent is extended or adjusted under 35 U.S.C. 154(b) by 954 days.

(21) Appl. No.: 12/055,022

(22) Filed: Mar. 25, 2008

(65) Prior Publication Data
US 2009/0249241 A1    Oct. 1, 2009

(51) Int. Cl.
*G06F 11/00* (2006.01)

(52) U.S. Cl. .................... 714/47.1; 709/223; 709/224

(58) Field of Classification Search .............. 714/47.1
See application file for complete search history.

(56) References Cited

U.S. PATENT DOCUMENTS

| | | | | |
|---|---|---|---|---|
| 6,334,196 B1* | 12/2001 | Smorodinsky et al. | ......... | 714/37 |
| 6,496,948 B1* | 12/2002 | Smorodinsky | ......... | 714/37 |
| 6,735,548 B1* | 5/2004 | Huang et al. | ......... | 702/179 |
| 6,895,533 B2* | 5/2005 | Gray et al. | ......... | 714/47.3 |
| 7,024,580 B2* | 4/2006 | Guimbellot et al. | ......... | 714/1 |
| 7,158,926 B2* | 1/2007 | Kampe | ......... | 703/22 |
| 7,197,447 B2* | 3/2007 | Susskind | ......... | 703/22 |
| 7,233,909 B2* | 6/2007 | Smith et al. | ......... | 705/7.35 |
| 7,284,146 B2* | 10/2007 | Guimbellot et al. | ......... | 714/1 |
| 7,426,554 B2* | 9/2008 | Kennedy | ......... | 709/223 |
| 7,930,137 B2* | 4/2011 | Lee et al. | ......... | 702/179 |
| 2002/0077800 A1* | 6/2002 | Kampe | ......... | 703/21 |
| 2003/0046615 A1* | 3/2003 | Stone | ......... | 714/47 |
| 2003/0172150 A1* | 9/2003 | Kennedy | ......... | 709/224 |
| 2003/0182599 A1* | 9/2003 | Gray et al. | ......... | 714/41 |
| 2004/0153866 A1* | 8/2004 | Guimbellot et al. | ......... | 714/47 |
| 2004/0230953 A1* | 11/2004 | Garzia et al. | ......... | 717/124 |
| 2006/0129367 A1* | 6/2006 | Mishra et al. | ......... | 703/13 |
| 2006/0136772 A1* | 6/2006 | Guimbellot et al. | ......... | 714/1 |
| 2007/0058554 A1* | 3/2007 | Benlarbi | ......... | 370/248 |
| 2009/0138753 A1* | 5/2009 | Tameshige et al. | ......... | 714/4 |
| 2009/0150717 A1* | 6/2009 | Lee et al. | ......... | 714/4 |
| 2009/0172168 A1* | 7/2009 | Sonoda et al. | ......... | 709/226 |
| 2011/0107138 A1* | 5/2011 | Tameshige et al. | ......... | 714/4.11 |

* cited by examiner

*Primary Examiner* — Kamini Patel
(74) *Attorney, Agent, or Firm* — Schwegman Lundberg & Woessner, P.A.

(57) ABSTRACT

According to one embodiment, an availability analysis tool includes executable code that is operable to calculate an availability value for a system having a number of operational units. The executable code may receive one or more reliability metrics for each operational unit and designate one or more reliability metrics for at least spare unit associated with the operational unit to be similar to the one or more reliability metrics. An availability value for the system may be calculated according to the reliability metrics of the operational unit and its associated at least one hot or cold spare unit. The executable code may then output this calculated availability value to the user interface.

19 Claims, 6 Drawing Sheets

$$P = \begin{array}{c} \text{FROM:} \\ \text{TO:} \\ 0 \\ 1 \\ 2 \\ 3 \end{array} \begin{array}{c} 0 \qquad 1 \qquad 2 \qquad 3 \\ \left| \begin{array}{cccc} 1-2\lambda & 0 & \mu_2 & 0 \\ \lambda & 1-\mu_1 & 0 & 0 \\ \lambda & \mu_1 & 1-\lambda-\mu_2 & 2\mu_2 \\ 0 & 0 & \lambda & 1-2\mu_2 \end{array} \right| \end{array}$$

FIG. 5

MARKOV Availability - Different MTBF

System Availability 0.99546322

| STATUS SUBSYSTEM | | | | | | | | | |
|---|---|---|---|---|---|---|---|---|---|
| Unit ID | EQUIPMENT | Identify Cold/Hot Spare | Operational IMTBF (Hours) | Spare MTBF (Hours) | Operational MTTS (Hours) | Spare MTTS (Hours) | Shut Down Time (Hours) | Operational IMTTF (Hours) | Spare MTTF (Hours) | Availability |
| U1 | Unit #1 | H | 13000 | 13000 | 0 | 0.1 | 0 | 360.5 | 360.5 | 0.992264666 |
| U2 | Unit #2 | C | 13000 | 13000 | 0 | 0.1 | 0 | 360 | 360 | 0.996619560 |
| U3 | Unit #3 | H | 88000 | 80000 | 0.1 | 1 | 3 | 336 | 336 | 0.999973448 |
| U4 | Unit #4 | H | 90000 | 70000 | 0.1 | 1.5 | 4 | 336 | 336 | 0.899864807 |
| U5 | Unit #5 | C | 134953 | 130000 | 0 | 1 | 5 | 336 | 336 | 0.399888400 |
| U6 | Unit #6 | C | 108796 | 100000 | 0.1 | 1 | 6 | 336 | 336 | 0.999984751 |
| U7 | Unit #7 | C | 1668 | 1600 | 0.1 | 1 | 7 | 2 | 2 | 0.999343788 |
| U8 | Unit #8 | H | 68241 | 68000 | 0 | 1 | 8 | 336 | 336 | 0.989961404 |
| U9 | Unit #9 | C | 208925 | 200000 | 0.2 | – | 98 | 336 | 336 | 0.999987687 |
| U10 | Unit #10 | H | 50000 | 60000 | 0.2 | – | 8 | 336 | 336 | 0.993358884 |
| U11 | Unit #11 | H | 1200000 | 1000000 | 0 | 1 | 10 | 336 | 336 | 0.999989073 |
| U12 | Unit #12 | H | 40000 | 50000 | 0.2 | 1 | 11 | 336 | 336 | 0.89814870 |
| | % | | | | | | Subsystem Availability | | | 0.997973638 |

Availability Individual

Availability All

AVAILABILITY ANALYSIS TOOL

GOVERNMENT RIGHTS

This invention was made with Government support under contract number 95-C-5052 awarded by the Malta Program. The Government has certain rights in this invention.

TECHNICAL FIELD OF THE DISCLOSURE

This disclosure generally relates to availability analysis, and more particularly to an availability analysis tool and method of operating the same.

BACKGROUND OF THE DISCLOSURE

System availability generally describes whether a system can perform its intended function. The system may include any type of equipment that is configured to provide a purpose and may be, for example, a computer or a network of computers.

SUMMARY OF THE DISCLOSURE

According to one embodiment, an availability analysis tool includes executable code that can calculate an availability value for a system that has a number of operational units. The executable code may receive one or more reliability metrics for each operational unit. One or more reliability metrics for at least one spare unit associated with the operational unit may be designated to be similar to the one or more reliability metrics. An availability value for the system may be calculated according to the reliability metrics of the operational unit and its associated at least one hot or cold spare unit. The executable code may then output this calculated availability value to the user interface.

Some embodiments of the disclosure may provide numerous technical advantages. For example, one embodiment of the availability analysis tool is operable to designate that reliability metrics of spare units are similar to reliability metrics of operational units associated with the spare units. Spare units may be substantially similar to their associated operational units, so designating similar reliability metrics for both types of units may reduce the burden of manual entry and reduce processing load.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 5 is a screenshot of one embodiment of a different mean time between failure window that may be displayed on the user interface by the availability analysis tool of FIG. 1.

DETAILED DESCRIPTION OF EXAMPLE EMBODIMENTS OF THE DISCLOSURE

System availability generally refers to the probability that a system is in an operable condition. Statistical modeling processes have been developed to analyze system availability. Availability analysis tools implementing these known statistical modeling processes, however, are generally difficult to use.

Figure 1:
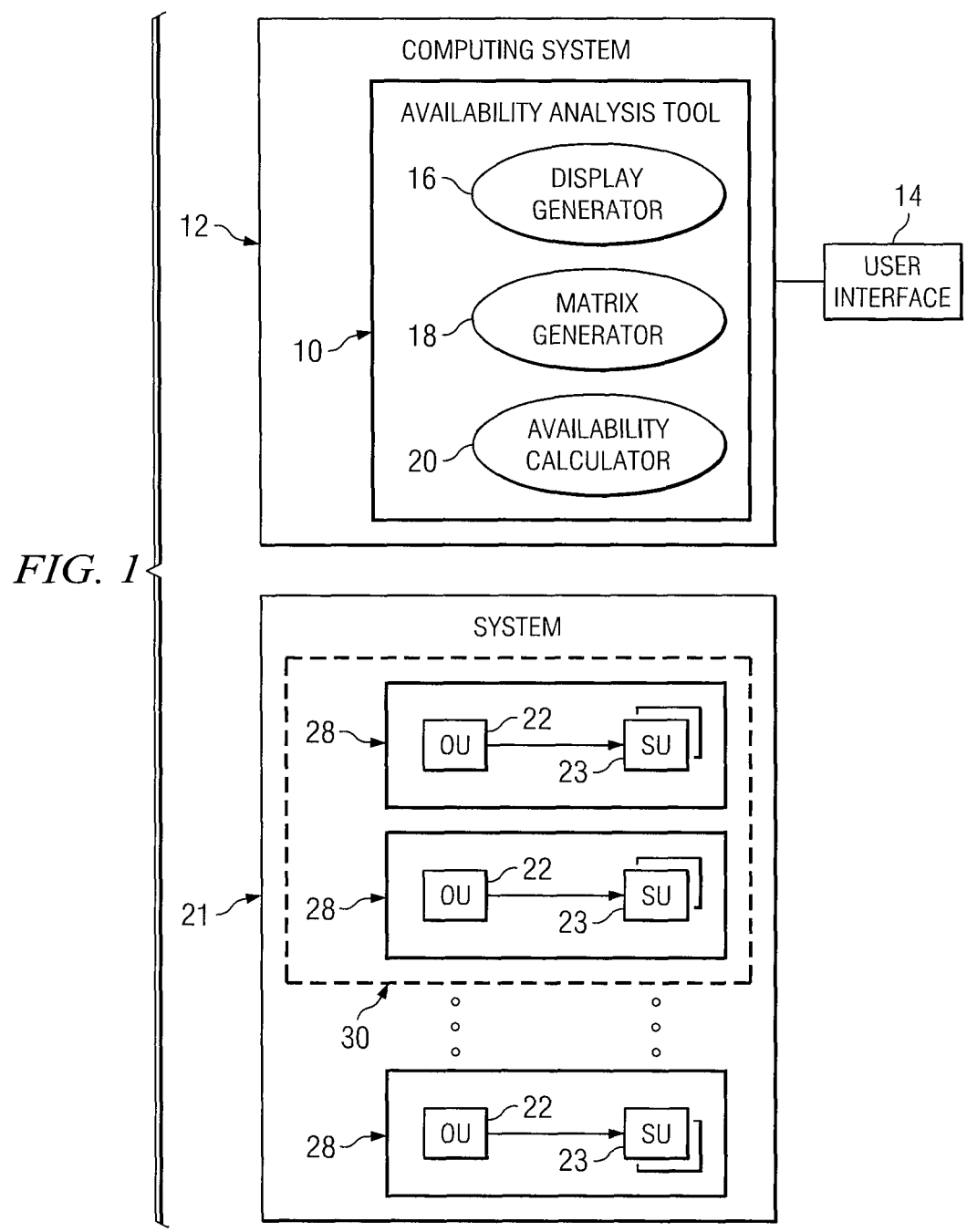
FIG. 1 is a block diagram showing one embodiment of an availability analysis tool according to the teachings of the present disclosure.
Figure 2A:
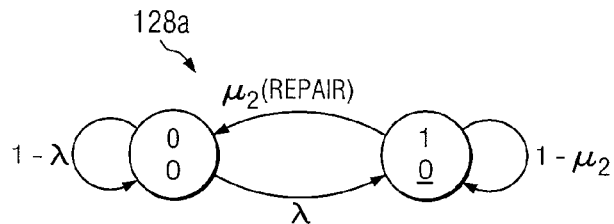
FIGS. 2A through 2D show several examples of Markov diagrams that represent operational unit/spare unit combinations of the system of FIG. 1.
Figure 2B:
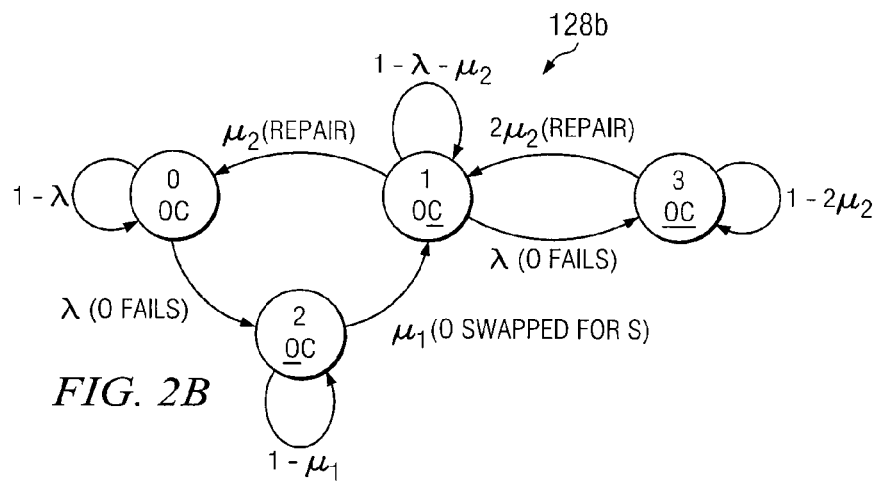
Figure 2C:
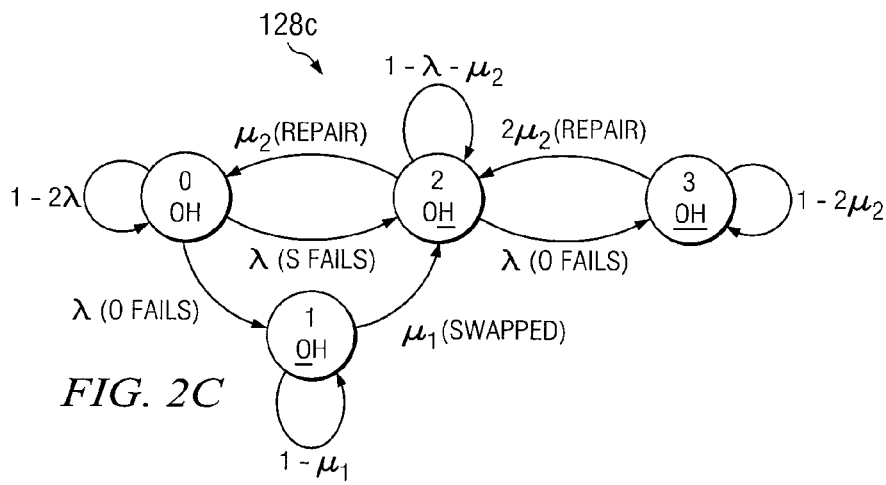
Figure 2D:
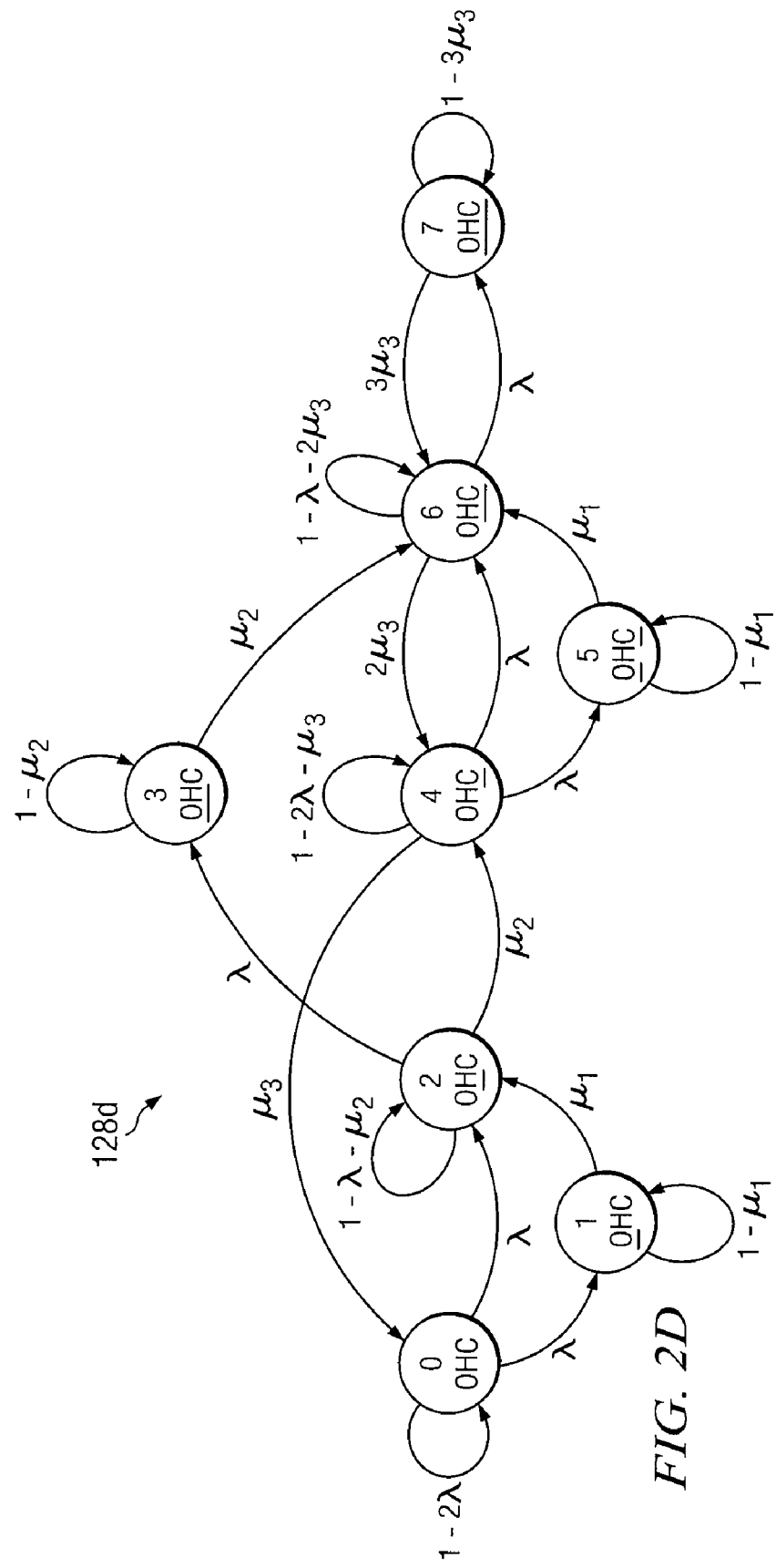

FIG. 1 shows one embodiment of an availability analysis tool 10 that may be used to calculate an availability value for a system 21. The system 21 may be any device, such as an electrical, a computing, or a mechanical system. The system 21 may have a number of operational units 22 and a number of spare units 23 associated with the operational units 22. An operational unit/spare unit combination 28 comprises an operational unit 22 and its associated one or more spare units 23. An operational unit 22 may comprise one or more devices that enable operation of the system 21. An operational unit 22 may be, for example, a power supply, a processor, a mass storage system, a random access memory (RAM) bank, or other devices used by the system 21.

A spare unit 23 may be any suitable device that can function in place of its associated operational unit 22. The design of a spare unit 23 may be similar to the design of its associated operational unit 22. Thus, the spare unit 23 may have operating characteristics that are similar to the characteristics of its associated operational unit 22. The availability analysis tool 10 may use the similarity of the characteristics to calculate availability, which may simplify user entry and reduce calculation burden upon the computing system 12 in certain embodiments.

In one embodiment, the operational unit/spare unit combinations 28 may be grouped in one or more subsystems 30. For example, the system 21 may be a computer network incorporating a number of subsystems 30, such as one or more personal computers or one or more network nodes that may include routers, network switches, or hubs.

Availability analysis tool 10 is executable on a computing system 12 coupled to a user interface 14 that transmits and receives information to and from a user. The availability analysis tool 10 generally includes a display generator 16, a matrix generator 18, and an availability calculator 20.

Computing system 12 may be any suitable type of computing system having one or more processors that is operable to execute instructions stored in a memory. Computing system 12 may be a network coupled computing system or a stand-alone computing system. In one embodiment, a stand-alone computer system may be any suitable computing system, such as a personal computer, laptop computer, or mainframe computer. In another embodiment, a network computing system may be a number of computer systems coupled together via a network, such as a local area network (LAN), a metropolitan area network (MAN), or a wide area network (WAN). A network computing system may enable the user interface 14 configured on one computing system to access the availability analysis tool 10 implemented on another computing system.

The availability analysis tool 10 can receive reliability metrics for each of a number of operational units 22, designate that reliability metrics for spare units 23 are similar to reliability metrics of operational units associated with the spare units 23, calculate an availability value from the reliability metrics, and output the calculated availability value to the user interface 14.

The display generator 16 may be used to create, modify, and/or delete information displayed at user interface 14. The information may describe operational units 22 and/or spare units 23, and may include operational characteristics and/or other alpha-numeric values. The display generator for 16 may include a text editor for entry or modification of information.

The matrix generator 18 generates a matrix of values. The matrix may be used to calculate an availability value according to a Markov process technique. A Markov process generally describes a stochastic process involving a number of states in which units of a system may exist at any one given time. A matrix of values indicates the probability of operational unit/spare unit combinations 28 in the system 21 transitioning from one state to another.

The availability calculator 20 calculates an availability value based on probability values stored in the matrix. The availability calculator 20 receives reliability metrics for the operational units 22 and their associated spare units 23 from the matrix generator 18 and calculates the availability value according to these reliability metrics. The availability calculator 20 may then output the availability value to the user interface 14.

In one embodiment, the display generator 16, matrix generator 18, and availability calculator 20 may be provided as an executable spreadsheet program that receives reliability metrics from the user interface 14 and calculates an availability value according to the reliability metrics. The user interface 14 may include a display, such as a cathode ray tube (CRT) or liquid crystal display (LCD), that can display a graphical user interface (GUI).

FIGS. 2A through 2D show several examples of Markov diagrams 128 that represent operational unit/spare unit combinations 28. The diagrams 128 describe a particular relationship of an operational unit 22 to one or more spare units 23.

Circles represent the possible states in which the operational unit/spare unit combination 28 may exist. The operational unit/spare unit combination 28 generally includes an operational unit 22 ("O"), and may include a hot spare unit 23 ("H") and/or a cold spare unit 23 ("C"). An operational unit ("O"), hot spare unit ("H"), and/or cold spare unit ("C") that has failed is designated by underlining its symbol ("O"), ("H"), and/or ("C"), respectively. Arrows leading from one circle to another include a statistical probability of movement from one state to another and may include variables, such as a failure rate ($\lambda$), a mean time to swap value ($\mu_1$), and a mean time to fix value ($\mu_2$).

Diagram 128a represents a 1 for 1 relationship in which no spare unit 23 exists. Diagram 128b represents a 2 for 1 relationship in which the operational unit ("O") is associated with one cold spare unit ("C") that is in a "cold standby" state. Diagram 128c represents 2 for 1 relationship in which the operational unit ("O") is associated with one hot spare unit ("H") that is in a "hot standby" state. Diagram 128d represents a 3 for 1 relationship in which the operational unit ("O") is associated with a cold spare unit ("C") and a hot spare unit ("H") in a "cold standby" state and a "hot standby" state, respectively.

Other combinations of operational unit/spare unit combinations 28 may be utilized with the availability analysis tool 10 according to the teachings of the present disclosure.

Figures 3, 6:
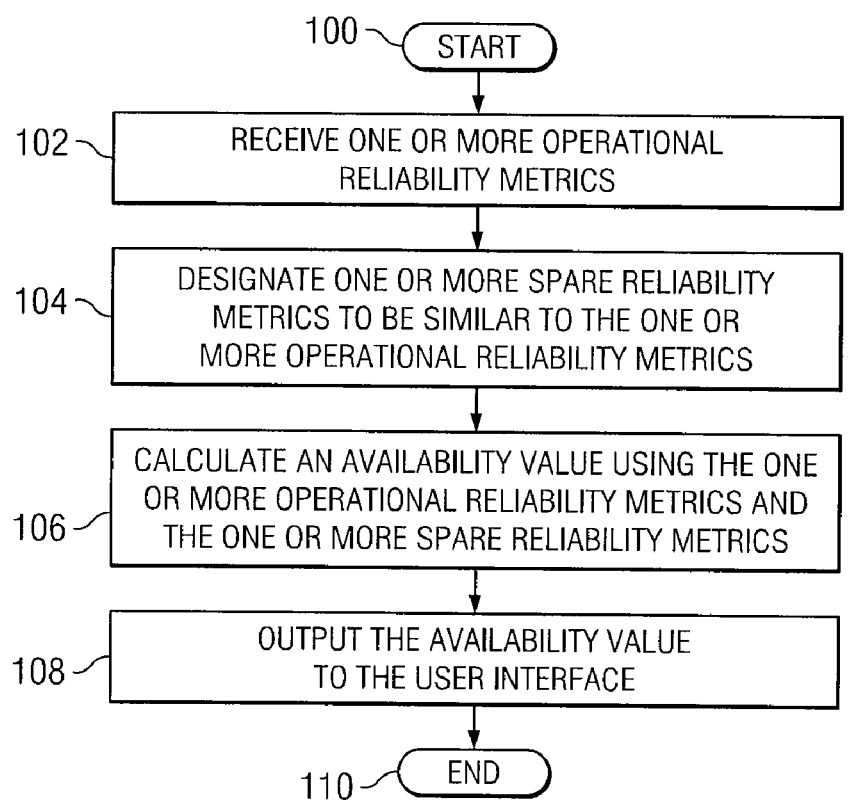
FIG. 3 is an example of a matrix that may be generated by the availability analysis tool of FIG. 1.
FIG. 6 is a flowchart showing one example of a series of actions that may be performed by the availability analysis tool of FIG. 1.

FIG. 3 shows one example of a matrix 68 that may be generated by the matrix generator 18. Matrix 68 is based on operational unit/spare unit combination 28c in which the operational unit 22 and its associated spare unit 23 is in a 2 for 1 relationship and the spare unit 23 is in a "hot standby" state. Other matrices similar to matrix 68 may be created for each operational unit/spare unit combination 28 described above.

Figure 4:
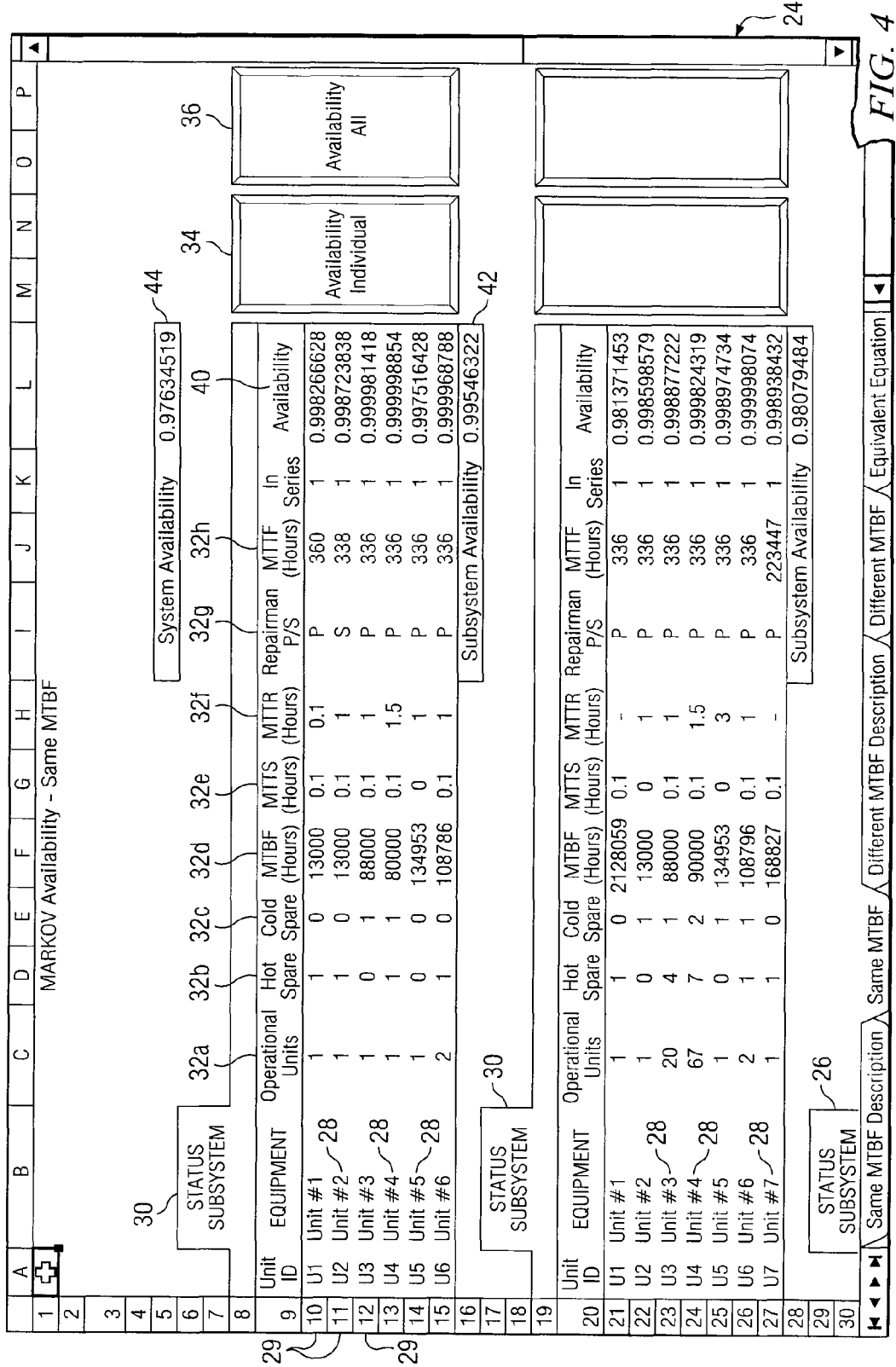
FIG. 4 is a screenshot of one embodiment of a same mean time between failure (MTBF) window that may be displayed on a user interface by the availability analysis tool of FIG. 1.

FIG. 4 shows one embodiment of a same mean time between failure (MTBF) window 24 that may be generated by the display generator 16 on the user interface 14. The same mean time between failure window 24 may be selected for view by selection of one of a number of tabs 26 configured on the user interface 14.

The same mean time between failure window 24 may analyze a system in which the spare units 23 have similar reliability metrics the reliability metrics of their associated operational units 22. The reliability metrics may include a mean time between failure (MTBF) value, mean time to swap (MTTS) value, mean time to repair (MTTR) value, mean time to fix (MTTF) value, and a serial/parallel repairman value.

Operational unit/spare unit combination rows 28 describe the reliability metrics of the operational unit/spare unit combinations 28 and have reliability metric fields 32. Reliability metric fields 32 may include an operational unit field 32a, a hot spare field 32b, and a cold spare field 32c, a mean time to failure field 32d, a mean time to swap field 32e, a mean time to replace field 32f, a repairman field 32g, and a mean time to fix field 32h.

The operational unit field 32a, hot spare field 32b, and cold spare field 32c generally describe the relationship of the operational unit 22 to its one or more respective spare units 23. The operational unit field 32a indicates the quantity of operational units 22 configured in the system. The hot spare field 32b indicates the quantity, if any, of hot spare units 23. A hot spare unit 23 remains powered on during operation of the system and is available for automatic switchover if its respective operational unit 22 fails. The cold spare field 32c indicates the quantity, if any, of cold spare units 23. A cold spare unit 23 is available for manual replacement of its respective operational unit 22.

The mean time between failure field 32d describes a mean time between failure value for the operational unit/spare unit combination 28. The mean time between failure value generally describes an estimated average time that the unit can be expected to function without failure. The mean time between failure value may be calculated from the failure rate of the unit or may be statistically determined.

The mean time to swap field 32e describes an average time required for the spare unit 23 to begin functioning in the event that its respective operational unit 22 ceases to function. The repairman field 32g indicates whether repair work is performed in a serial fashion ("S") or in a parallel fashion ("P"). The mean time to fix field 32h describes an average amount of elapsed time required to fix a failed operational unit 22 or spare unit 23.

An individual availability execution button 34 and a system availability execution button 36 may be used to invoke the matrix generator 18 and availability calculator 20 to perform an availability analysis. If the individual availability execution button 34 is selected after selecting a particular unit availability field 40, availability values may be calculated for that operational unit/spare unit combination 28. The result is then displayed in unit availability field 40 corresponding to the operational unit/spare unit combinations 28. If the availability all execution button 36 is selected, an availability value may be calculated for the operational unit/spare unit combinations 28 of the system. The results are displayed in a number of unit availability fields 40 corresponding to the operational unit/spare unit combinations 28 and the availability value for the subsystem may be displayed in a subsystem availability field 42 and a system availability field 44.

FIG. 5 shows one embodiment of a different mean time between failure window 50 that may be displayed by the display generator 16 on the user interface 14. The different mean time between failure window 50 may be used to calculate an availability value of a system 21 in which the reliability metrics of the spare units 23 may differ from the reliability metrics of the operational units 22. For example, a spare unit 23 has fewer components than its respective operational unit 22.

Operational unit/spare unit combination rows 29 have a number of reliability metric fields 52. Reliability metric fields 52 may include a hot/cold spare field 52a, an operational mean time between failure field 52b, a spare mean time between failure field 52c, an operational mean time to swap field 52d, a spare mean time to swap field 52e, a shut down time field 52f, an operational mean time to fix field 52g, and a spare mean time to fix field 52h.

The hot/cold spare field 52a indicates whether the spare unit 23 operates as a hot spare unit ("H") or a cold spare unit ("C"). The operational mean time between failure field 52b and spare mean time between failure field 52c allow for entry of different mean time between failure values. The operational mean time to swap field 52b and spare mean time to swap field 52c allow for entry of different values. The shut down time field 52f indicates an expected amount of elapsed time that the system may be shut down in order to transition the system back to its original configuration after all of the operational units 22 have been repaired. The operational mean time to fix field 52g and spare mean time to fix field 52h allow for entry of different mean time to fix values.

An individual availability execution button 54 and a system availability execution button 56 invoke the matrix generator 18 and availability calculator 20 to perform an availability analysis in a manner similar to individual availability execution button 34 and system availability execution button 36 of FIG. 4.

FIG. 6 is a flowchart showing one embodiment of a series of actions that may be performed by the availability analysis tool 10 to calculate an availability value for system 21. In act 100, the process is initiated. In act 102, the availability analysis tool 10 may receive one or more reliability metrics associated with a number of operational units 22 configured in the system 21. In one embodiment, the availability analysis tool 10 may receive mean time between failure values, mean time to swap values, mean time to fix values, serial/parallel repairman values, and/or hot/cold swap values for the operational units 22 and its associated one or more spare units 23.

In act 104, the availability analysis tool 10 may designate the reliability metrics of the spare units 23 as being similar to or different from the reliability metrics of operational units 22 associated with the spare units 23. Certain embodiments in which the reliability metrics are similar may require relatively fewer calculations and relatively faster results.

In act 106, the availability analysis tool 10 may calculate an availability value of the system 21 based on the reliability metrics. In one embodiment, the availability analysis tool 10 may calculate an availability value using a Markov process. The Markov process may include modeling the probable states of the operational unit/spare unit combinations 28. Matrix 68 is generated from these states. Matrix 68 has values representing the probabilities of transition between states.

The availability calculator 20 may calculate an availability value the system 21 from matrix 68 according to the formula:

$$X = r/(P - I + C)$$

where:
P is matrix 68
I is an identity matrix of the same size as the P matrix.
C is a matrix with the same size as P matrix that contains all is in its first row.
r is a vector with the same size as X having 1 as its first component and 0s everywhere else.
X is a state vector representing the steady state solution.

The state vector X is a vector that may include a number of operational and non-operational states. State vector X is a one dimensional vector having a number of elements. Each element of X comprises a probability value of system 21 existing in one particular state. The availability calculator 20 may add the numerical values of the operational states in order to derive an availability value.

In one embodiment, the availability analysis tool 10 may calculate a number of availability values for each operational unit/spare unit combinations 28 configured in the system 21. In this manner, users of the availability analysis tool 10 may be able to identify particular operational unit/spare unit combinations 28 that are affecting the overall availability value of the system 21.

In act 108, the availability analysis tool 10 may output the availability value to the user interface 14. The previously described series of actions 102 through 108 may be repeated in order calculate availability values for other operational unit/spare unit combinations 28 in the system 21.

An availability analysis tool 10 has been described that may calculate an availability value for a system 21 having a number of operational unit/spare unit combinations 28. The availability analysis tool 10 may optionally be operable to designate various reliability metrics of each spare unit 23 to be similar to or different from the reliability metrics of operational units 22 associated with the spare units 22. Thus, the availability analysis tool 10 may provide enhanced ease of use by reducing the required user knowledge of the Markov process, reducing the quantity of input parameters from the user as well as reducing the elapsed time required by the availability analysis tool 10 to provide meaningful results.

Modifications, additions, or omissions may be made to availability analysis tool 10 without departing from the scope of the invention. The components of availability analysis tool 10 may be integrated or separated. For example, the display generator 16, matrix generator 18, and/or availability calculator 20 may be configured one or multiple computing systems 12. Moreover, the operations of availability analysis tool 10 may be performed by more, fewer, or other components. For example, the operations of matrix generator 18 and availability calculator 20 may be performed by one component, or the operations of matrix generator 18 and availability calculator 20 may be performed by more than one component. Additionally, operations of availability analysis tool 10 may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. One or more non-transitory computer readable storage media storing code for calculating an availability value for a system having a plurality of operational units and unit combinations that, when executed by one or more processors configures the processors to:

receive, from a user interface, one or more operational reliability metrics for each operational unit in an operational state, the operational unit being selected from the plurality of operational units of the system;

designate that one or more spare reliability metrics for at least one spare unit associated with the operational unit are similar to the one or more operational reliability metrics such that the operational unit and the at least one spare unit comprise a combinational group of units, the at least one spare unit comprises a first spare unit in a cold standby state and a second spare unit in a hot standby state;

express the one or more spare reliability metrics and the operational reliability metrics as one or more reliability metrics for the combinational group;

calculate a plurality of transition values for the combinational group based on the one or more reliability metrics, each of the plurality of transition values indicating a corresponding probability of the combinational group transitioning from a first state of the operational state, the cold standby state, and the hot standby state to a second state of the operational state, the cold standby state, and the hot standby state, the calculating of the plurality of transition values comprising calculating a probability that the combinational group is to transition from the cold standby state to the hot standby state, or from the hot standby state to the cold standby state;

calculate an availability value for the system based on the plurality of transition values, to calculate the availability value comprising adding one or more transition values of the plurality of transition values corresponding to probabilities of the combinational group being in the operational state, and refraining from adding other transition values corresponding to probabilities of the combination group being in the cold standby state or the hot standby state; and output the availability value to the user interface.

2. The storage media of claim 1, wherein the code further configures the processors to:

receive, from the user interface, one or more second operational reliability metrics for the operational unit;

receive, from the user interface, one or more second spare reliability metrics for each of the at least one spare unit, the one or more second spare reliability metrics being different from the one or more second operational reliability metrics; and calculate the availability value for the system in accordance with the one or more second operational reliability metrics and the one or more second spare reliability metrics.

3. The storage media of claim 1, wherein at least one of the one or more operational reliability metrics comprises at least one reliability value that is selected from the group consisting of a mean time between failure value, mean time to swap value, a mean time to fix value, a mean time to repair value, and a serial/parallel repairman value.

4. The storage media of claim 1, wherein the availability value is calculated according to a Markov process.

5. The storage media of claim 1, wherein the code further configures the processors to:

calculate an availability value for each of a plurality of subsystems, each subsystem of the plurality of subsystems comprising one or more operational units of the plurality of operational units.

6. The storage media of claim 1, wherein the code further configures to:

calculate an availability value for each operational unit of the system.

7. A method for calculating an availability value for a system having a plurality of operational units and a number of operational unit combinations, the method comprising:

receiving, from a user interface, one or more operational reliability metrics for each operational unit in an operational state, the operational unit being selected from the plurality of operational units of the system;

designating that one or more spare reliability metrics for at least one spare unit associated with the operational unit are similar to the one or more operational reliability metrics such that the operational unit and the at least one spare unit comprise a combinational group of units, the at least one spare unit comprises a first spare unit in a cold standby state and a second spare unit in a hot standby state;

expressing the one or more spare reliability metrics and the operational reliability metrics as one or more reliability metrics for the combinational group;

calculating, using at least one processor, a plurality of transition values for the combinational group based on the one or more reliability metrics, each of the plurality of transition values indicating a corresponding possibility of the combinational group transitioning from a first state of the operational state, the cold standby state, and the hot standby state to a second state of the operational state, the cold standby state, and the hot standby state, the calculating of the plurality of transition values comprising calculating a probability that the combinational group is to transition from the cold standby state to the hot standby state, or from the hot standby state to the cold standby state;

calculating an availability value for the system based on the plurality of transition values, the calculating the availability value comprising adding one or more transition values of the plurality of transition values corresponding to probabilities of the combinational group being in the operational state, and refraining from adding other transition values corresponding to probabilities of the combination group being in the cold standby state or the hot standby state; and outputting the availability value to the user interface.

8. The method of claim 7, further comprising:

receiving, from the user interface, one or more second operational reliability metrics for the operational unit;

receiving, from the user interface, one or more second spare reliability metrics for each of the at least one spare unit, the one or more second spare reliability metrics being different from the one or more second operational reliability metrics; and calculating the availability value for the system in accordance with the one or more second operational reliability metrics and the one or more second spare reliability metrics.

9. The method of claim 7, wherein at least one of the one or more operational reliability metrics comprises at least one reliability value that is selected from the group consisting of a mean time between failure value, mean time to swap value, a mean time to fix value, a mean time to repair value, and a serial/parallel repairman value.

10. The method of claim 7, wherein the availability value for the system is calculated according to a Markov process.

11. The method of claim 7, further comprising:
grouping the plurality of operational units into a plurality of subsystems; and
calculating an availability value for each of the plurality of subsystems.

12. The method of claim 7, further comprising:
calculating an availability value for each operational unit of the system.

13. An apparatus for calculating an availability value for a system having a number of operational units and a plurality of operational unit combinations, the apparatus comprising:
a user interface; and
at least one processor to run an availability analysis tool, the availability analysis tool coupled to the user interface and operable to:
receive, from a user interface, one or more operational reliability metrics for each operational unit in an operational state, the operational unit being selected from the plurality of operational units of the system;
designate that one or more spare reliability metrics for at least one spare unit associated with the operational unit are similar to the one or more operational reliability metrics such that the operational unit and the at least one spare unit comprise a combinational group of units, the at least one spare unit comprises a first spare unit in a cold standby state and a second spare unit in a hot standby state;
express the one or more spare reliability metrics and the operational reliability metrics as one or more reliability metrics for the combinational group;
calculate a plurality of transition values for the combinational group based on the one or more reliability metrics, each of the plurality of transition values indicating a corresponding possibility of the combinational group transitioning from a first state of the operational state, the cold standby state, and the hot standby state to a second state of the operational state, the cold standby state, and the hot standby state, the calculating of the plurality of transition values comprising calculating a probability that the combinational group is to transition from the cold standby state to the hot standby state, or from the hot standby state to the cold standby state;
calculate an availability value for the system based on the plurality of transition values, to calculate the availability value comprising adding one or more transition values of the plurality of transition values corresponding to probabilities of the combinational group being in the operational state, and refraining from adding other transition values corresponding to probabilities of the combination group being in the cold standby state or the hot standby state; and
output the availability value to the user interface.

14. The apparatus of claim 13, wherein at least one of the one or more operational reliability metrics comprises at least one reliability value that is selected from the group consisting of a mean time between failure value, mean time to swap value, a mean time to fix value, a mean time to repair value, and a serial/parallel repairman value.

15. The apparatus of claim 13, wherein the availability analysis tool is configured to calculate the availability value according to a Markov process.

16. The apparatus of claim 13, wherein the availability analysis tool is configured to calculate an availability value for each operational unit of the system.

17. An apparatus for calculating an availability value for a system having a number of operational units and a plurality of operational unit combinations, the apparatus comprising:
a user interface; and
at least one processor to run an availability analysis tool, the availability analysis tool configured to:
designate at least one spare unit for at least one operational unit in an operational state selected from the plurality of operational units such that the at least one operational unit and the at least one spare unit comprise a combinational group of units, the at least one spare unit comprises a first spare unit in a cold standby state and a second spare unit in a hot standby state;
calculate a plurality of transition values for the combinational group, each of the plurality of transition values indicating a corresponding possibility of the combinational group transitioning from a first state to a second state, each of the first and second states being selected from a group of states including the operational state, the cold standby state, and the hot standby state, the calculating of the plurality of transition values comprising calculating a probability that the combinational group is to transition from the cold standby state to the hot standby state, or from the hot standby state to the cold standby state;
calculate an availability value for the system using the plurality of transition values, to calculate the availability value comprising adding one or more transition values of the plurality of transition values corresponding to probabilities of the combinational group being in the operational state, and refraining from adding other transition values corresponding to probabilities of the combination group being in the cold standby state or the hot standby state; and
present the availability value to the user interface to allow a user to be able to identify particular operational and spare unit combinations that are affecting the system.

18. The method of claim 7, wherein the first spare unit is configured to be powered off during operation of the system and to be manually switched over with a corresponding operational unit that fails, and the second spare unit is configured to be powered on during the operation of the system and to be automatically switched over with the corresponding operational unit.

19. The method of claim 7, wherein the outputting of the availability value to the user interface comprises allowing a user to be able to identify particular operational and spare unit combinations that are affecting the system.

* * * * *

UNITED STATES PATENT AND TRADEMARK OFFICE
CERTIFICATE OF CORRECTION

PATENT NO. : 8,335,947 B2
APPLICATION NO. : 12/055022
DATED : January 15, 2013
INVENTOR(S) : Gerald R. Hoffmann It is certified that error appears in the above-identified patent and that said Letters Patent is hereby corrected as shown below:

In the Specifications:

In column 4, line 3, delete "28c" and insert --28--, therefor

In column 4, line 16, after "metrics", insert --as--, therefor

In column 6, line 2, after "value", insert --of--, therefor

In column 6, line 9, delete "is" and insert --1's--, therefor

In column 6, line 32, after "order", insert --to--, therefor

In column 6, line 40, delete "22" and insert --23--, therefor

In column 6, line 51, after "configured", insert --on--, therefor

In the Claims:

In column 8, line 43, in claim 7, delete "the calculating" and insert --to calculate--, therefor Signed and Sealed this
Twenty-third Day of April, 2013

Teresa Stanek Rea
*Acting Director of the United States Patent and Trademark Office*